US011873978B2

(12) United States Patent
Jiang

(10) Patent No.: US 11,873,978 B2
(45) Date of Patent: Jan. 16, 2024

(54) LIGHTING FIXTURES

(71) Applicants: SUZHOU OPPLE LIGHTING CO., LTD., Suzhou (CN); OPPLE LIGHTING CO., LTD., Shanghai (CN)

(72) Inventor: Haitao Jiang, Suzhou (CN)

(73) Assignees: Suzhou Opple Lighting Co., Ltd., Suzhou (CN); Opple Lighting Co., Ltd., Shanghai (CN)

( * ) Notice: Subject to any disclaimer, the term of this patent is extended or adjusted under 35 U.S.C. 154(b) by 0 days.

(21) Appl. No.: 18/074,453

(22) Filed: Dec. 3, 2022

(65) Prior Publication Data

US 2023/0101336 A1 Mar. 30, 2023

Related U.S. Application Data

(63) Continuation of application No. PCT/CN2021/097898, filed on Jun. 2, 2021.

(30) Foreign Application Priority Data

Jun. 15, 2020 (CN) ......................... 202021105049.0

(51) Int. Cl.

| | |
|---|---|
| ***F21V 21/10*** | (2006.01) |
| ***F21S 6/00*** | (2006.01) |
| ***F21V 23/06*** | (2006.01) |

(52) U.S. Cl.

CPC .............. *F21V 21/10* (2013.01); *F21S 6/002* (2013.01); *F21V 23/06* (2013.01)

(58) Field of Classification Search

CPC ........... F21V 23/06; F21V 21/10; F21S 6/002

See application file for complete search history.

(56) References Cited

U.S. PATENT DOCUMENTS

| | | | |
|---|---|---|---|
| D675,765 S * | 2/2013 | Fung | D26/65 |
| 10,051,930 B2 | 8/2018 | Heim | |
| 2011/0051438 A1 | 3/2011 | Lee | |
| 2016/0201706 A1 | 7/2016 | Heim | |
| 2020/0240578 A1 | 7/2020 | Chen | |
| 2022/0120393 A1 * | 4/2022 | Shao | F21V 21/28 |

FOREIGN PATENT DOCUMENTS

| | | |
|---|---|---|
| CH | 203215413 U | 9/2013 |
| CN | 201062733 Y | 5/2008 |
| CN | 202253110 U | 5/2012 |
| CN | 104110587 A | 10/2014 |
| CN | 204593027 U | 8/2015 |

(Continued)

OTHER PUBLICATIONS

International Search Report of PCT Application No. PCT/CN2021/097898 dated Aug. 23, 2021 with English translation, (6p).

*Primary Examiner* — Anabel Ton

(74) *Attorney, Agent, or Firm* — Arch & Lake LLP

(57) ABSTRACT

The application discloses a lighting fixture. The lighting fixture includes a base assembly; and a bracket assembly connected with the base assembly. The bracket assembly is configured to carry a first lamp body. The bracket assembly includes a first lamp pole movably connected with the base assembly, so that the first lamp pole is capable of moving close to or moving away from the base assembly.

19 Claims, 10 Drawing Sheets

(56) References Cited

FOREIGN PATENT DOCUMENTS

| | | | | | |
|---|---|---|---|---|---|
| CN | 206786535 U | | 12/2017 | | |
| CN | 107543121 A | | 1/2018 | | |
| CN | 208418264 U | | 1/2019 | | |
| CN | 209445140 U | | 9/2019 | | |
| CN | 110469793 A | | 11/2019 | | |
| CN | 209744218 U | | 12/2019 | | |
| CN | 210424593 U | | 4/2020 | | |
| CN | 210424593 U | * | 4/2020 | ................ | F21S 6/00 |
| CN | 210687863 U | | 6/2020 | | |
| CN | 212204139 U | | 12/2020 | | |
| CN | 112524524 A | * | 3/2021 | | |
| CN | 114811539 B | * | 11/2022 | | |
| CN | 218763193 U | * | 3/2023 | | |
| GB | 397311 A | | 8/1933 | | |

* cited by examiner

LIGHTING FIXTURES

CROSS-REFERENCE TO RELATED APPLICATIONS

This application is based upon and claims the priority of PCT patent application No. PCT/CN2021/097898 filed on Jun. 2, 2021 which claims priority to the Chinese patent application No. 202021105049.0 filed on Jun. 15, 2020, the entire contents of which are hereby incorporated by reference herein for all purposes.

TECHNICAL FIELD

This application relates to a technical field of illumination, in particular to a lighting fixture.

BACKGROUND

Sometimes, a table lamp is a household appliance used for illumination, and a function of the table lamp is to concentrate the light in a small area to convenient for work and study.

SUMMARY

The present disclosure provides a lighting fixture.

According to the present disclosure, a lighting figure may include: a base assembly; and a bracket assembly connected with the base assembly, and the bracket assembly is configured to carry a first lamp body, the bracket assembly comprises a first lamp pole movably connected with the base assembly, so that the first lamp pole is capable of moving close to or moving away from the base assembly.

It is to be understood that the foregoing general description and the following detailed description are exemplary and explanatory only and are not restrictive of the disclosure.

BRIEF DESCRIPTION OF THE DRAWINGS

The drawings described herein are used to provide further understanding of the present application and constitute a part of the present application. The schematic examples and descriptions of the present application are used to explain the present application and do not constitute an improper limitation of the present application. In the drawings.

DETAILED DESCRIPTION

In order to make the objectives, technical solutions and advantages of the present application clearer, the technical solutions of the present application are clearly and completely described below with reference to the examples of the present application and the corresponding drawings. It is apparent that the described examples are only a part of the examples of the present application, but not all of the examples. Based on the examples in the present application, all other examples obtained by those of ordinary skill in the art without creative efforts shall fall within the scope of the present application.

Sometimes, a lamp holder (or light pole) of a table lamp is difficult to fold, which leads to the inconvenience of the storage of the table lamp.

Figure 1:
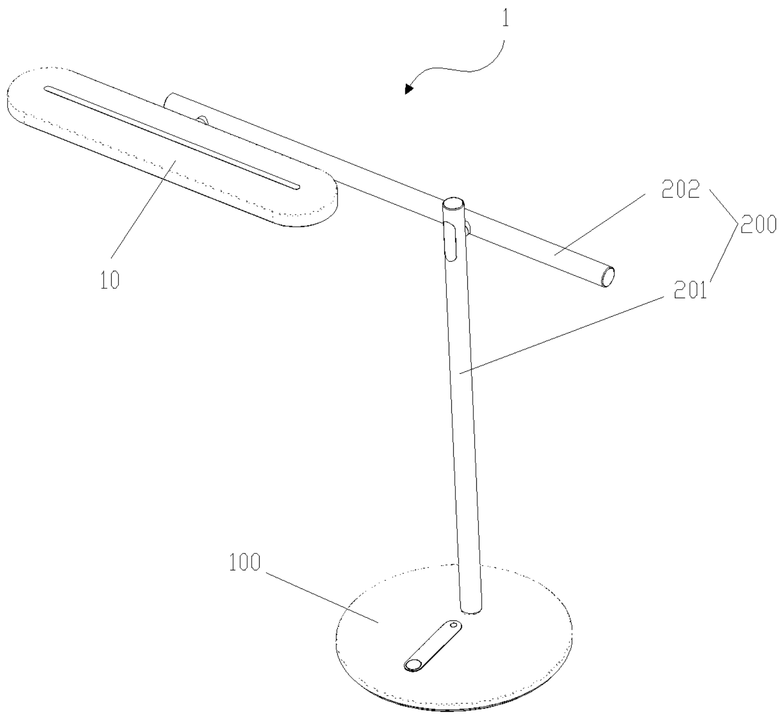
FIG. 1 schematically shows an overall view of a lighting fixture according to the present application.

FIG. 1 schematically shows an overall view of a lighting fixture 1 according to the present application. As shown in FIG. 1, the lighting fixture 1 includes a base assembly 100 and a bracket assembly 200, and the bracket assembly 200 is connected with the base assembly 100. The bracket assembly 200 is configured to carry the first lamp body 10. The bracket assembly 200 includes a first lamp pole 201 movably connected with the base assembly 100, so that the first lamp pole 201 is capable of moving close to or moving away from the base assembly 100.

With this structure, when the lighting fixture 1 is used, the first lamp pole 201 can be moved away from the base assembly 100, so that the lighting fixture 1 can be turned on to use the lighting fixture 1. When the lighting fixture 1 needs to be stored, the first lamp pole 201 can be moved close to the base assembly 100, so as to reduce the volume of lighting fixture 1 for easy storage, which is convenient for use by a user.

Figure 2:
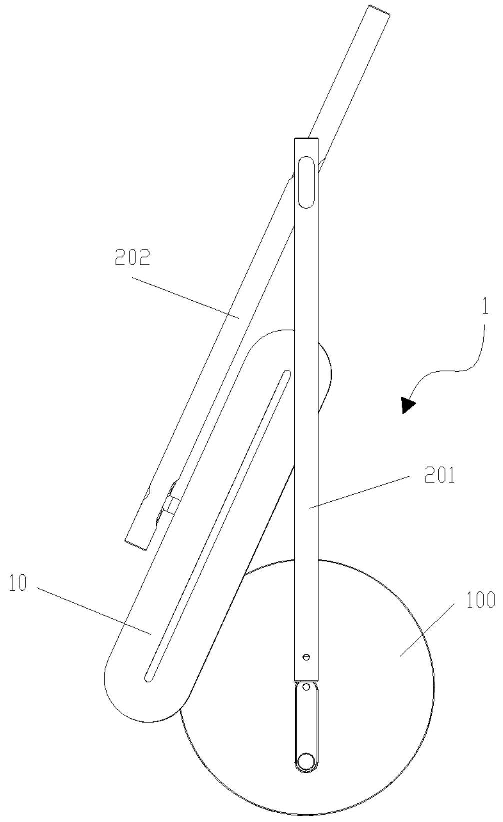
FIG. 2 and FIG. 3 schematically show different states of a lighting fixture according to the present application.
Figure 3:
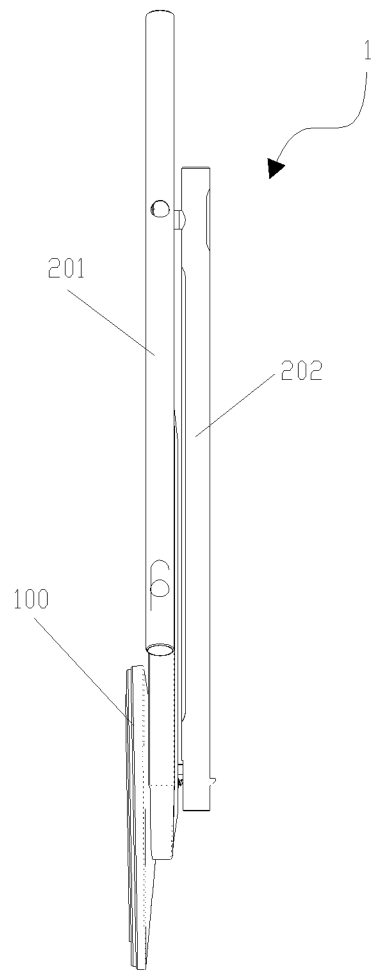

In an example, as shown in FIG. 2 and FIG. 3, the bracket assembly 200 includes a plurality of lamp poles that are movably connected, such as a first lamp pole 201 and a second lamp pole 202. In a first state (i.e., a use state) of lighting fixture 1, the first lamp pole 201 acts as a vertical pole and is connected with the base assembly 100, and the second lamp pole 202 acts as a horizontal pole and carries the first lamp body 10 (as shown in FIG. 2). It should be understood that the vertical pole and horizontal pole described here cannot be comprehended according to the vertical and horizontal in the mathematical sense, and the vertical pole and horizontal pole described here can be deviated from the standard vertical and horizontal directions according to the use requirements of the lighting fixture 1, so as to realize specific needs for lighting, so that the use by a user is easy. When the lighting fixture 1 needs to be stored, the first lamp pole 201 may be rotated close to the base assembly 100, and the second lamp pole 202 can be rotated close to the first lamp pole 201 and the base assembly 100, so that the lighting fixture 1 is entered a second state (i.e., a closed state) (as shown in FIG. 3). In the following, the bracket assembly 200 is described with the first lamp pole 201 and the second lamp pole 202. It should be understood that the bracket assembly 200 may also have more movably connected lamp poles, which is not repeated here.

Figure 4:
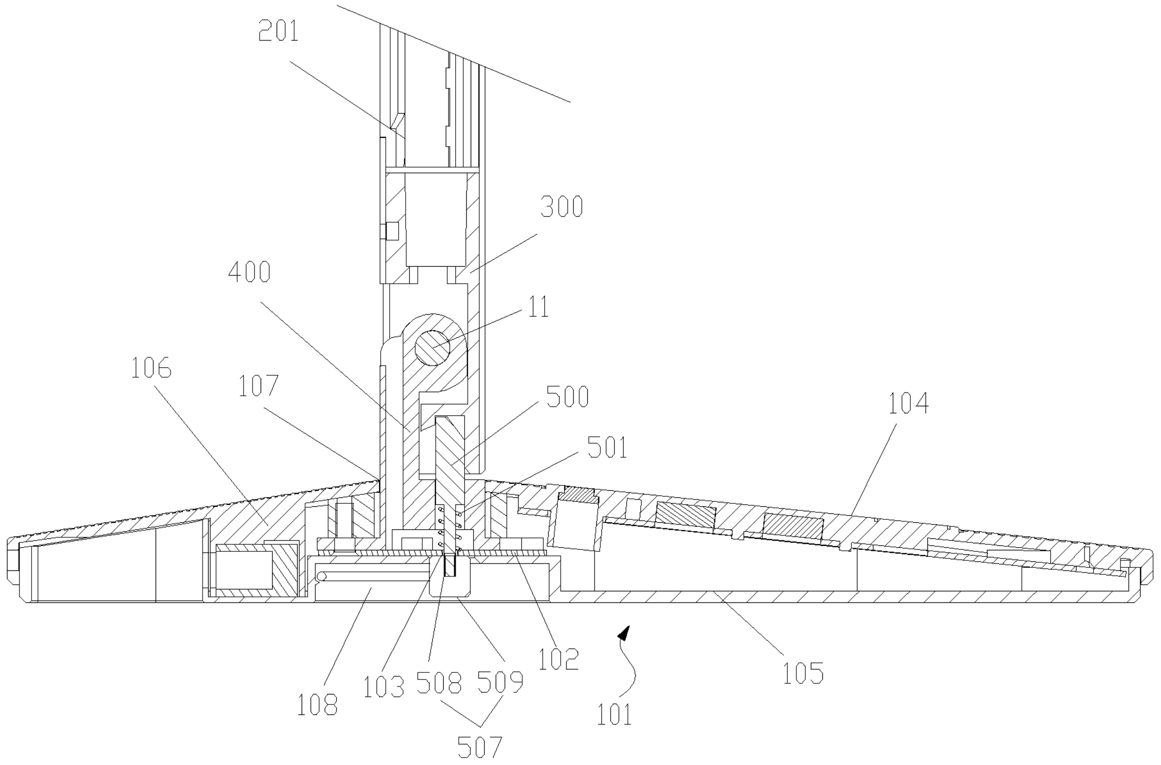
FIG. 4 schematically shows a connection structure of the first lamp pole and the base assembly of lighting fixture.
Figure 6:
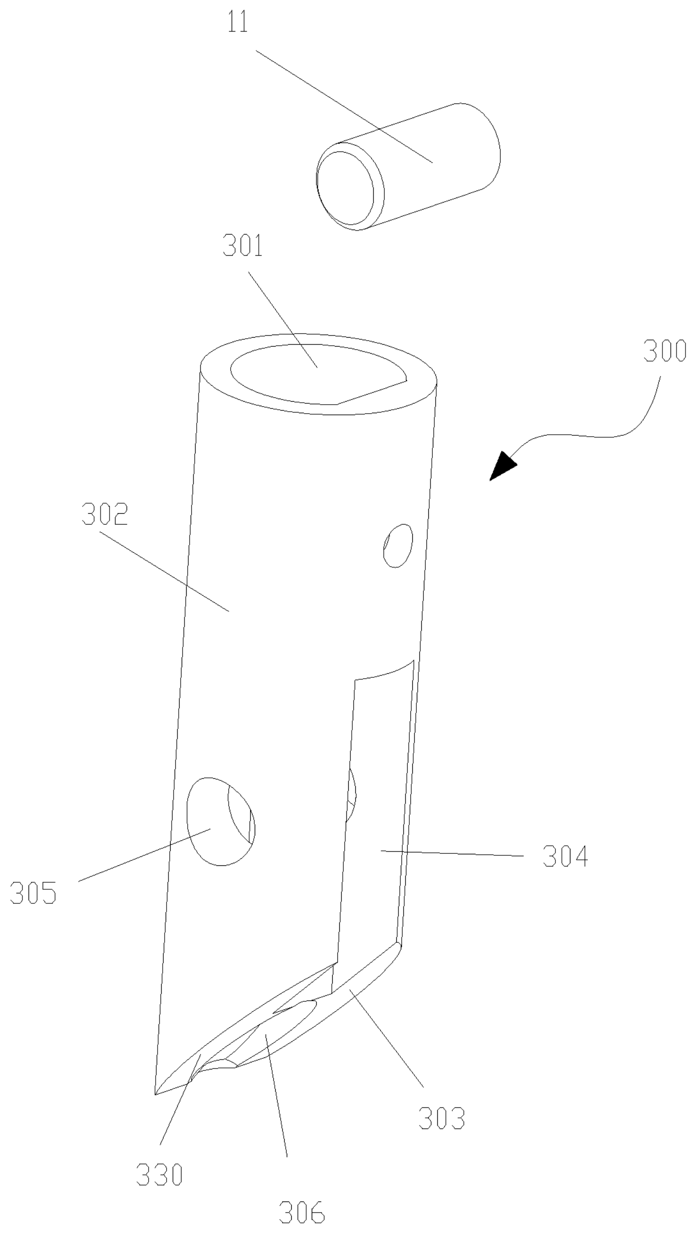
FIG. 6 schematically shows a structure of the plunger.
Figure 7:
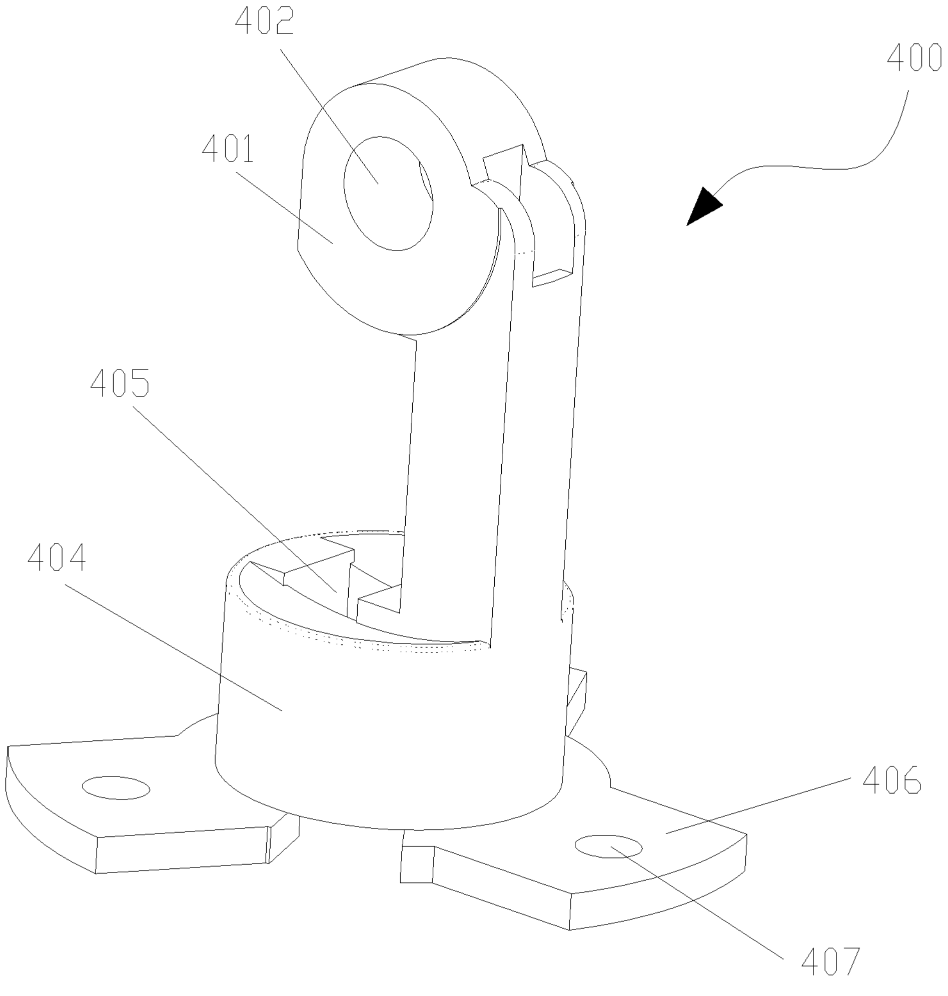
FIG. 7 schematically shows a structure of the plug connector.

FIG. 4 schematically shows a connection structure of the first lamp pole 201 of lighting fixture 1 and the base assembly 100. As shown in FIG. 4, an end of the first lamp pole 201 is provided with a plunger 300. The plunger 300 has an inner cavity 301, and a circumferential side wall 302 of the plunger 300 is provided with a notch 304 extending from an end 303 of the plunger 300 along a generatrix (as shown in FIG. 6). The base assembly 100 includes a body 101 and a plug connector 400 extending outwardly from the body 101. A plug 401 of the plug connector 400 is provided with a first through hole 402, and the plunger 300 is provided with a hinge hole 305 (as shown in FIG. 7) corresponding to the first through hole 402. The plug 401 and the plunger 300 are hinged together through a hinge shaft 11 passing through the first through hole 402 and the hinge hole 305.

According to the structure shown in FIG. 4, FIG. 6, and FIG. 7, the notch 304 on the plunger 300 is formed a space for the movement of the plug connector 400. For example, in the first state of the lighting fixture 1, the plug 401 of the plug connector 400 is embedded in the notch 304, and an axis of the plug 401 and an axis of the plunger 300 are both in the vertical direction, so that the first lamp pole 201 (or the plunger 300) is in a vertical state. The first light pole 201 is pushed to rotate from the first state, the axis of the plug connector 400 or the plug 401 is still in the vertical direction, and the plunger 300 is gradually deviated from the vertical direction with the help of the notch 304, that is, the first lamp pole 201 is rotated relative to the base assembly 100 and close to the base assembly 100, and the lighting fixture 1 is transformed into the second state.

In an example, the plunger 300 and the first lamp pole 201 are separate structures and are fixedly connected, and an end of the first lamp pole 201 is provided with an opening 203 corresponding to the notch 304. In this way, the plunger 300 and the first lamp pole 201 may be individually formed and then assembled together. Compared with the integratedly formed the plunger 300 and the first lamp pole 201, the manufacturing of the first lamp pole 201 and the plunger 300 of the present application are simplified, thereby reducing the cost.

Figure 8:
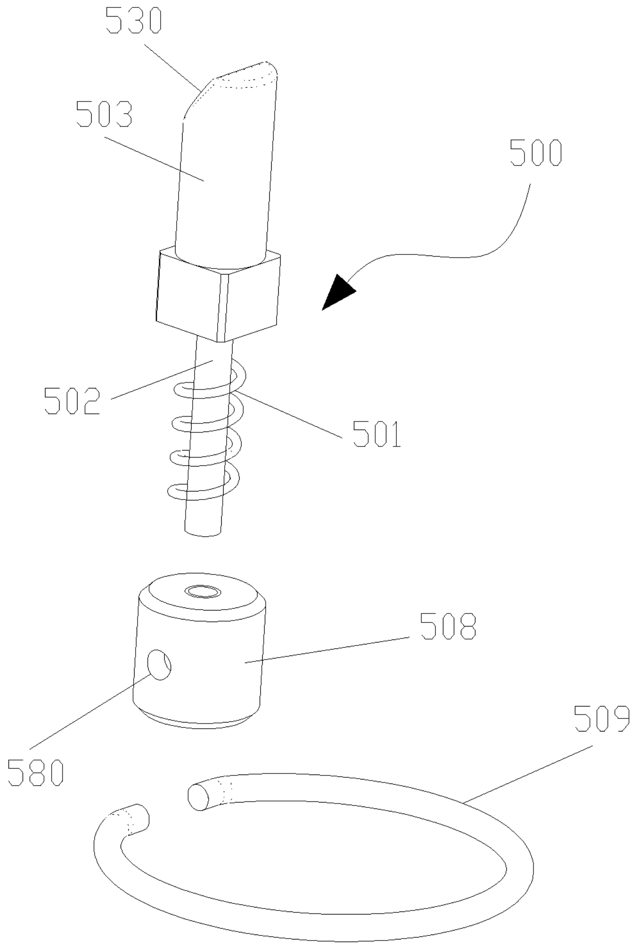
FIG. 8 schematically shows a structure of the elastic pin.

In the first state of the lighting fixture 1, in order to keep the first lamp pole 201 stably in the vertical state, the base assembly 100 further includes an elastic pin 500. FIG. 8 schematically shows a structure of the elastic pin 500. The structure and functions of the elastic pin 500 is described below.

As shown in FIG. 4 to FIG. 8, on the end face of an end 303 of the plunger 300 is provided with a plug hole 306 connected with the inner cavity 301 of the plunger 300, and the plug hole 306 is separated from the notch 304. The plug connector 400 further includes a base portion 404 set in the body 101, and the base portion 404 is provided with a second through hole 405 corresponding to the plug hole 306. The base assembly 100 further includes an elastic pin 500 and an elastic member 501 that urges the elastic pin 500 to move axially.

In the above-mentioned first state, the elastic member 501 is loosened, and the elastic pin 500 is extended through the second through hole 405 of the plug connector 400 and the plug hole 306 of the plunger 300 to enter the inner cavity 301 of the plunger 300. Under the retaining action of the circumferential side wall 302 of the plunger 300, the elastic pin 500 can only be in the inner cavity 301 and remain in a vertical state, so that the plug connector 400 and the plunger 300 that are passed through by the elastic pin 500 are remained in a vertical state, and therefore the first lamp pole 201 (or the plunger 300) is further remained in a vertical state.

When the lighting fixture 1 needs to be stored, the elastic pin 500 is moved away from the plug hole 306 of the plunger 300 and the inner cavity 301, and the elastic member 501 is compressed. In this situation, the first lamp pole 201 can be pushed to rotate relative to the plug connector 400 (i.e., the axis of the plunger 300 is deviated from the vertical direction) and can be rotated close to the base assembly 100, so that the lighting fixture 1 is entered the second state (i.e., the closed state).

In order to facilitate the rotation of the first lamp pole 201 (or the plunger 300), as shown in FIG. 8, an end wall of the end 303 of the plunger 300 is formed as a first inclined surface 330, a top surface of a head 503 of the elastic pin 500 is formed as a second inclined surfaces 530, and the second inclined surface 530 is matched with the first inclined surface 330. In this way, when the first lamp pole 201 is pushed to rotate, the first inclined surface of the plunger 300 slides along the second inclined surface of the elastic pin 500, so that the rotation of the first lamp pole 201 is smoother.

As further shown in FIG. 8, the elastic member 501 is a coil spring wound and installed on the tail 502 of the elastic pin 500. The radial dimension of the head 503 of the elastic pin 500 is larger than the radial dimension of the tail 502, so that one end of the coil spring may be fixed at the variable diameter position between the head 503 and the tail 502, and the other end of the coil spring is fixed in body 101 of the base assembly 100, which is described below. It should be understood that the head 503 of the elastic pin 500 is used to extend and plug into the inner cavity 301 of the plunger 300.

The base assembly 100 further includes a pressure plate 102 in the body 101, the pressure plate 102 is provided with an operation hole 103. The head 503 of the elastic pin 500 is located in an inner side of the pressure plate 102, and the tail 502 is extended through the operation hole 103. The other end of the elastic member 501 is fixed on the pressure plate 102. In this way, when the tail 502 of the elastic pin 500 is pulled on the outside of the pressure plate 102, the elastic pin 500 can be moved away from the plug hole 306 of the plunger 300 and the inner cavity 301, and the elastic member 501 can be compressed (so that the lighting fixture 1 is entered the second state). In a case where the second through hole 405 of the plug connector 400 is aligned with the plug hole 306 of the plunger 300, after the elastic pin 500 is loosened, under the action of the elastic member 501, the elastic pin 500 is moved through the second through hole 405 and the plug hole 306 to enter the inner cavity 301 of the plunger 300, so that the lighting fixture 1 is entered the first state.

In order to facilitate the pulling of the elastic pin 500, a pulling member 507 is installed on the tail 502 of the elastic pin 500, and the pulling member 507 is located in an outside the pressure plate 102. For example, the pulling member 507 includes a nut 508 installed on the tail 502 of the elastic pin 500 and a pull ring 509 (as shown in FIG. 8) movably installed on the nut 508. For example, a pull ring 509 is clamped the ring hole 580 on the nut 508.

Figure 5:
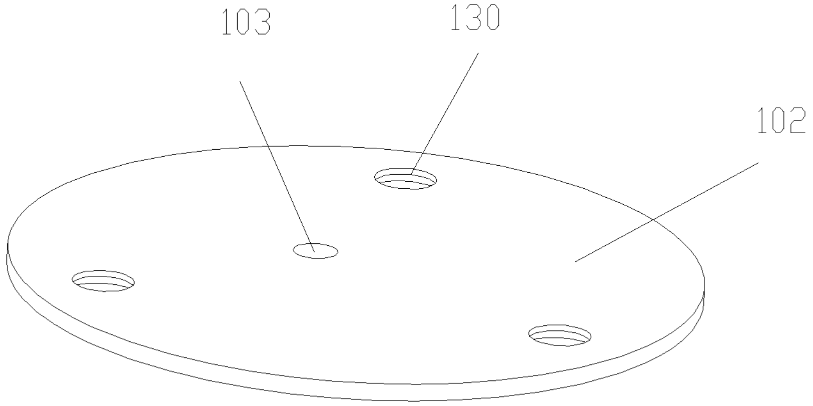
FIG. 5 schematically shows a structure of the pressure plate.

As shown in FIG. 4 and FIG. 5, it should be understood that the base portion 404 of the plug connector 400 is fastened on the pressure plate 102. For example, three fixing plates 406 extending radially outward are provided on the base portion 404, each fixing plate is provided with a screw hole 407, and the pressure plate 102 is configured with a hole 130 corresponding to the screw hole 407, so that the plug connector 400 and the pressure plate 102 may be fastened together by a screw.

As Further shown in FIG. 4, the body 101 of the base assembly 100 further includes a base front cover 104, a base rear cover 105, and a balancing weight 106, the base front cover 104 and the base rear cover 105 are fastened into a box body, and the balancing weight 106 is fixed in the box body. The base front cover 104 is provided with a connecting hole 107 configured to be passed through by the plug connector 400, and the pressure plate 102 is installed on an inner side of the base rear cover 105. It should be understood that, in the box, the plug connector 400 deviates the balancing weight 106, or the balancing weight 106 is provided with a through hole for the plug connector 400 to pass through. In addition, a circuit structure may also be provided in the box body to realize power supply and control of the lighting fixture 1, which is not repeated here.

A groove 108 is formed on an outside surface of the base rear cover 105, and the pulling member 507 is accommodated in the groove 108. In this way, the elastic pin 500 can be operated outside the lighting fixture 1, which facilitates a user to store the lighting fixture 1. When the lighting fixture 1 is used, the pulling member 507 can be hidden in the groove 108, so as not to be accidentally touched, so that the lighting fixture 1 in a use state is ensured.

Figure 9:
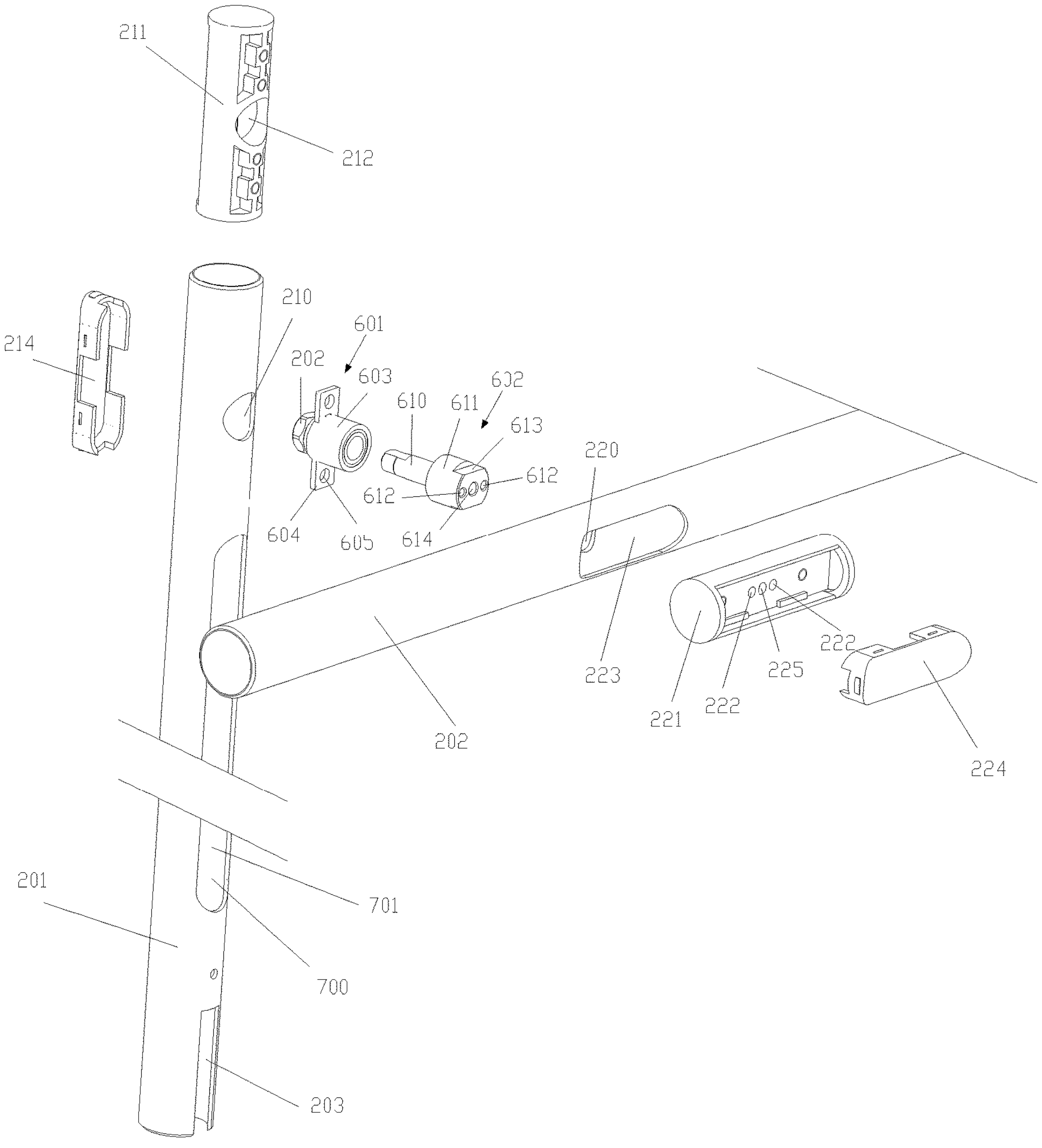
FIG. 9 schematically shows a connection structure of the first lamp pole and the second lamp pole in an exploded view.
Figure 10:
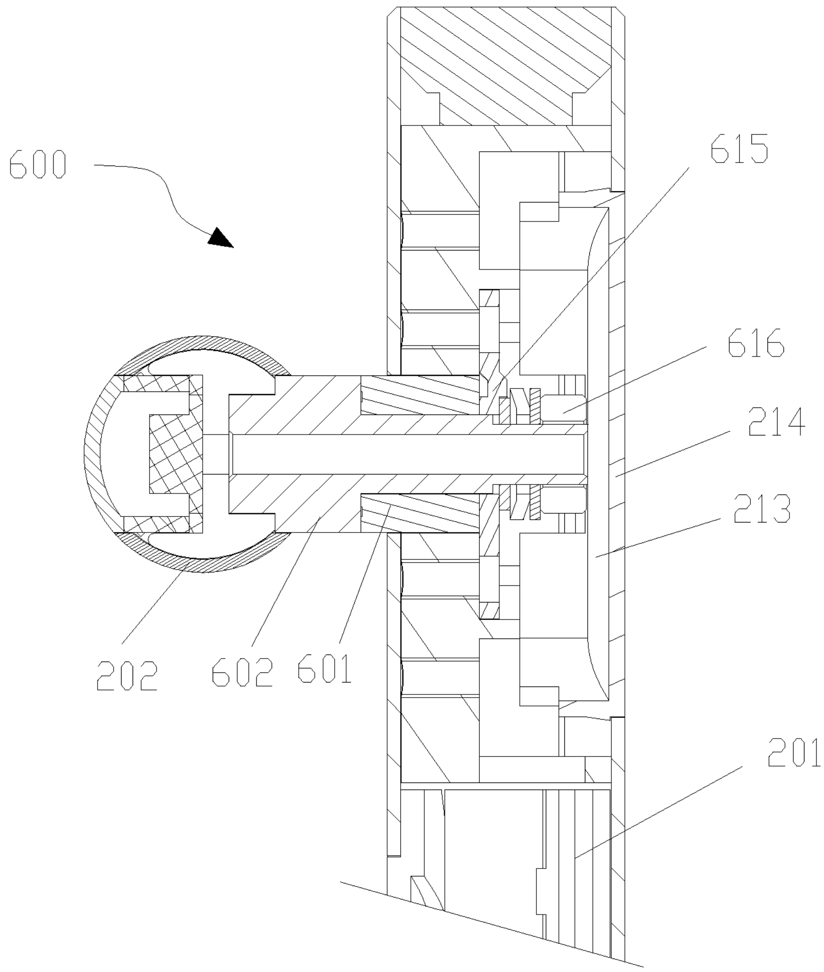
FIG. 10 schematically shows a cross-sectional view of the rotating assembly.

As described above, the bracket assembly 200 includes the first lamp pole 201 and the second lamp pole 202 that are movable connected. For example, the second lamp pole 202 and the first lamp pole 201 are movably connected by a rotating assembly 600, so that the second lamp pole 202 can be rotated relative to the first lamp pole 201. FIG. 9 schematically shows an above-mentioned connection structure of the first lamp pole 201 and the second lamp pole 202. FIG. 10 schematically shows a cross-sectional view of the rotating assembly 600. The structure and functions of the rotating assembly 600 is described below.

As shown in FIG. 9 and FIG. 10, the rotating assembly 600 includes a sleeve 601 fixed on the first lamp pole 201 and a rotating shaft 602 installed on the second lamp pole 202, and a rotating shaft 602 is rotatably plugged into the sleeve 601. In this way, the first lamp pole 201 and the second lamp pole 202 can be relatively rotated.

The sleeve 601 includes a tube body 603 and a wing 604. The wing 604 is extended radially outward from the tube body 603, and a first fixing hole 605 is provided on the wing 604. The first lamp pole 201 is a pipe member, and the first lamp pole 201 is provided with a first installation hole 210. The tube body 603 is extended from the inside of the first lamp pole 201 through the first installation hole 210 to the outside of the first lamp pole 201, and the wing 604 is fixed on the inside of the first lamp pole 201.

Preferably, a first liner pipe 211 is fixedly arranged in the first lamp pole 201 (for example, fastened by a screw), and the first liner pipe 211 is provided with a liner hole 212 corresponding to the first installation hole 210. The tube body 603 is extended from the inside of the first liner pipe 211 through the first installation hole 210 and the liner hole 212 to the outside of the first lamp pole 201. In the first liner pipe 211, the wing 604 is fixed to the first liner pipe 211 and the first light pole 201. The inventors found that, by arranging the first liner pipe 211, the stability of the sleeve 601 can be significantly improved, and the first lamp pole 201 cannot be damaged, especially in a case where the first lamp pole 201 has a thin wall pole with poor strength.

In addition, in order to facilitate the installation of the sleeve 601, the first lamp pole 201 and the first liner pipe 211 (if any) are provided with aligned first operating grooves 213, and the first operating grooves 213 are opened on radially opposite sides of the first installation hole 210 and the liner hole 212. The first operating grooves 213 are snapped by a first groove cover 214. In this way, after the sleeve 601 is installed on the first lamp pole 201, the first operating groove 213 can be covered with the first groove cover 214, which is convenient for operation.

As further shown in FIG. 9 and FIG. 10, the rotating shaft 602 includes a rotating portion 610 rotatably plugged into the tube body 603 and an installation portion 611 installed on the second lamp pole 202. The outer diameter of the installation portion 611 is larger than the outer diameter of the rotating portion 610. In this way, the installation portion 611 can abut against the tube body 603 to avoid the axial movement of the rotating shaft 602, thereby making the second lamp pole 202 more stable.

The second lamp pole 202 is a pipe member, a second installation hole 220 is provided on the second lamp pole 202, and a second liner pipe 221 is fixedly arranged in the second lamp pole 202 corresponding to the second installation hole 220. The installation portion 611 of the rotating shaft 602 is extended from the outside of the second lamp pole 202 through the second installation hole 220 and is fixed to the second liner pipe 221. The second liner pipe 221 can greatly improve the stability of the rotating shaft 602 and prevent the second lamp pole 202 from being damaged, especially in a case where the first lamp pole 202 has a thin wall pole with poor strength.

In an example, the second liner pipe 221 is provided with a second fixing hole 222, and an end surface of the installation portion 611 is provided with a third fixing hole 612 corresponding to the second fixing hole 222. In this way, the rotating shaft 602 and the second liner pipe 221 are fastened by a screw passed through the second fixing hole 222 and the third fixing hole 612. Because the second liner pipe 221 is fixed on the second lamp pole 202, the rotating shaft 602, the second liner pipe 221, and the second lamp pole 202 are fastened together.

In addition, the installation portion 611 of the rotating shaft 602 is provided with a fool-proof structure 613, and a structure matching the fool-proof structure 613 is provided on the second liner pipe 221 (not shown in the figures), so as to further simplify the installation of the rotating shaft 602.

Similar to the first lamp pole 201, in order to facilitate the installation of the rotating shaft 602 and the second liner pipe 221, the second lamp pole 202 and the second liner pipe 221 are provided with aligned second operating grooves 223, and the second operating grooves 223 are opened on the radially opposite sides of the second installation hole 220 and the second fixing hole 222, and the second operating grooves 223 are snapped by a second groove cover 224.

As further shown in FIG. 9, a first threading hole 614 is axially provided on the rotating shaft 602, and the first threading hole 614 is deviated from the third fixing hole 612. The second liner pipe 221 is provided with a second threading hole 225 corresponding to the first threading hole 614. For example, the third fixing hole 612 includes two holes spaced apart from each other, and the first threading hole 614 is located between the two holes of the third fixing hole 612. The second fixing hole 222 of the second liner pipe 221 and the second threading hole 225 are corresponding to the corresponding holes on the rotating shaft 602. In this way, a cable (not shown in the figure) can extend from the first lamp pole 201 to the second lamp pole 202 through the first threading hole 614 and the second threading hole 225, so as to supply power to the first lamp body 10. With this structure, even if the second lamp pole 202 is greatly rotated relative to the first light pole 201, the cable cannot be entangled, thereby facilitating the use of the user.

As further shown in FIG. 10, the rotating portion 610 of the rotating shaft 602 is extended through the tube body 603, and an elastic washer 615 and a tightening nut 616 are installed at the end of the rotating portion 610. The elastic washer 615 frictionally fits the tub body 603 by the tightening nut 616. By tightening the tightening nut 616, the tightening nut 616, the elastic washer 615, and the rotating shaft 602 are fastened to each other. Moreover, by tightening the tightening nut 616, the elastic washer 615 maintains a frictional fit with the tube body 603 (or the sleeve 601), so as to apply damping to the rotation of the second lamp pole 202, so that the second lamp pole 202 can be maintained at any required rotation angle as required, which greatly facilitates use. Furthermore, the friction force between the elastic washer 615 and the tube body 603 can be adjusted by adjusting the tightening extent of the tightening nut 616, thereby adjusting the damping of the second lamp pole 202, which also makes the use of lighting fixture 1 more convenient.

A second lamp body 700 is installed in the first lamp pole 201 and/or a second lamp body 700 is installed in the second lamp pole 202. The second lamp body 700 can be a secondary lamp of the lighting fixture 1, for example, the second lamp body 700 may be used as a night lamp. In this way, the lighting fixture 1 according to the present application can realize not only the function of daily illumination, but also the function of night illumination, so that the integration degree of the lighting fixture 1 is improved. In this way, the functions of the lighting fixture 1 are increased, while the weight and size of the lighting fixture 1 are almost not increased, thereby facilitating the use of the user. The following description is given by using the installation of the second lamp body 700 in the first lamp pole 201 as an example.

Figure 11:
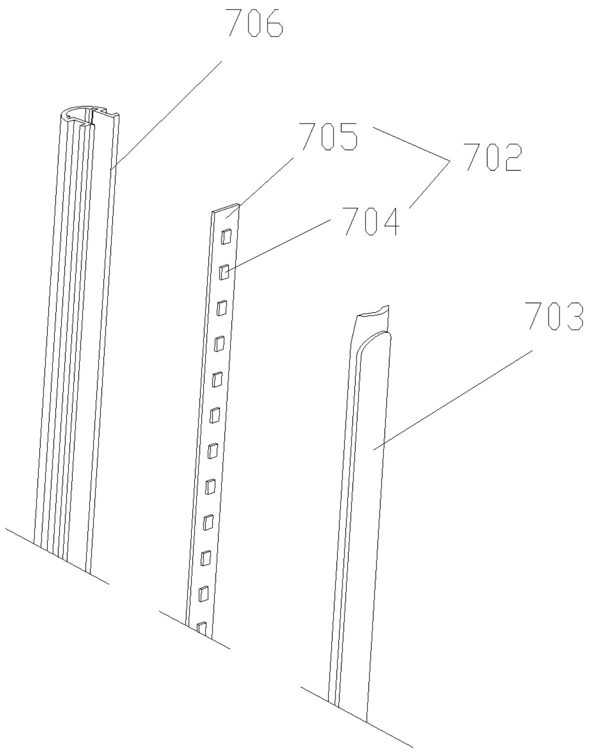
FIG. 11 schematically shows a structure of the second lamp body in an exploded view.
Figure 12:
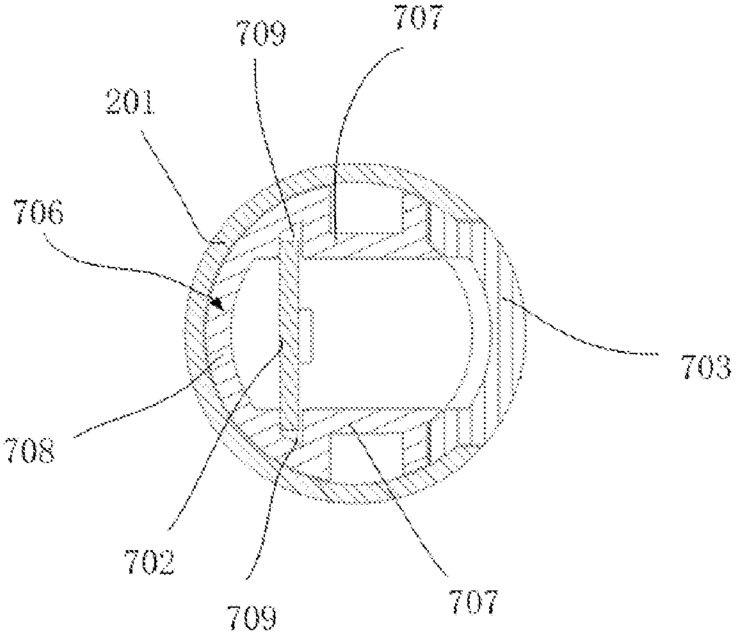
FIG. 12 schematically shows a cross-sectional view of the second lamp body.

The first lamp pole 201 is configured as a tubular body, and the tubular body is provided with a light emitting area for the second lamp body 700. As shown in FIG. 11 and FIG. 12, the second lamp body 700 includes a light source 702 in the tubular body corresponding to the light emitting area 701 and a light-transmitting cover 703 embedded in the light emitting area 701. The light-transmitting cover 703 can soften the light emitted by the light source 702 and/or expand the irradiation area, so that the second lamp body 700 is more suitable for use as a night lamp. In addition, the light-transmitting cover 703 further isolates the light source 702 from the external environment, so that the light source 702 can be protected, and the user can be prevented from being hurt by directly touching the light source 702.

The light-transmitting cover 703 is flush with the surface of the tubular body. On the whole, the light-transmitting cover 703 and the tubular body form a smooth whole body. In this way, when a user touches the tubular body from the outside of the first lamp pole 201, the user can have a good touch feeling. In an example, the section of the tubular body is a circle, and the section of the light-transmitting cover 703 is an arc having the same diameter as the circle.

The light emitting area 701 is arranged along the axial direction of the tubular body, the light source 702 includes a plate body 705 carrying a plurality of light emitting points 704 which are discrete, and the plurality of light emitting points 704 are arranged along the axial direction of the tubular body corresponding to the light emitting area 701. On the whole, the second light body 700 is formed into a strip-shaped light strip arranged along the axial direction of the first light pole 201, which helps to improve lighting effect as a night lamp. In an example, the light emitting points 704 are light-emitting LEDs. Of course, the light-emitting points 704 can also be other types of light sources, such as energy-saving bulbs and the like, which are not repeated here.

The second lamp body 700 further includes a light-transmitting cover bracket 706, and the light-transmitting cover bracket 706 is arranged in the tubular body and is configured to support the light source 702 and the light-transmitting cover 703. For example, as shown in FIG. 12, viewed from in cross-section, the light-transmitting cover bracket 706 includes two extending arms 707 that are spaced apart from each other and a connecting portion 708 connecting the two extending arms 707. As a whole, the cross-section of the light-transmitting cover bracket 706 is generally U-shaped. Opposite sides of the two extending arms are respectively provided with grooves, the plate body 705 is carried on the grooves 709, and the two extending arms 707 that are spaced apart from each other is configured to support the light-transmitting cover 703. In an example, the light-transmitting cover bracket 706 is made of aluminum and is thermally connected to the tubular body. In this way, the light-transmitting cover bracket 706 plays a role to support the light source 702 and the light-transmitting cover 703, and plays a role in heat transfer/heat dissipation.

The present disclosure provides a lighting fixture, which may include: a base assembly; and a bracket assembly connected with the base assembly, and the bracket assembly is configured to carry a first lamp body, the bracket assembly comprises a first lamp pole movably connected with the base assembly, so that the first lamp pole is capable of moving close to or moving away from the base assembly.

In an example, an end of the first lamp pole is provided with a plunger with an inner cavity, and a circumferential side wall of the plunger is provided with a notch extending from an end of the plunger along a generatrix; and the base assembly comprises a body and a plug connector extending outward from the body, the plug connector comprises a plug provided with a first through hole, the plunger is provided with a hinge hole corresponding to the first through hole, and the plug and the plunger are hinged together through a hinge shaft passed through the first through hole and the hinge hole, in a first state, an axis of the plug and an axis of the plunger are both in a vertical direction, so that the first lamp pole is in a vertical state; and in a second state, the axis of the plug is in the vertical direction, and the axis of the plunger is deviated from the vertical direction, so that the first lamp pole is rotated relative to the base assembly.

In an example, the plunger and the first lamp pole are separate structures that are fixedly connected together, and an opening corresponding to the notch is formed at the end of the first lamp pole.

In an example, an end face of an end of the plunger is provided with a plug hole connected with the inner cavity of the plunger, and the plug hole is separated from the notch; the plug connector further comprises a base portion set in the body, and the base portion is provided with a second through hole corresponding to the plug hole; and the base assembly further comprises an elastic pin and an elastic member to actuate the axial movement of the elastic pin; in the first state, the elastic member is loosened, so that the elastic pin is extended through the second through hole and the plug hole to enter the inner cavity of the plunger, so as to ensure the axis of the plug and the axis of the plunger both in the vertical direction, so that the first lamp pole is remained in the vertical state; and in the second state, the elastic member is compressed, the elastic pin leaves away from the inner cavity of the plunger, the axis of the plunger is deviated from the vertical direction, and the first lamp pole is rotatable relative to the base assembly.

In an example, an end wall of the plunger is formed as a first inclined surface, a top surface of a head of the elastic pin is formed as a second inclined surface, and the second inclined surface is matched with the first inclined surface.

In an example, the elastic member is a coil spring, and the coil spring is wound and installed on the tail of the elastic pin.

In an example, the base assembly further comprises a pressure plate in the body, the pressure plate is provided with an operation hole, the head of the elastic pin is located in an inner side of the pressure plate, and the tail of the elastic pin is extended through the operation hole; and the base portion of the plug connector is fixed on the pressure plate, an end of the elastic member is fixed on the tail of the elastic pin, and other end of the elastic member is fixed on the pressure plate.

In an example, a pulling member is installed on the tail of the elastic pin, and the pulling member is located in an outside of the pressure plate.

In an example, the pulling member comprises a nut installed on the tail of the elastic pin and a pull ring movably installed on the nut.

In an example, the body of the base assembly comprises a base front cover, a base rear cover, and a balancing weight, the base front cover and the base rear cover are fastened into a box body, and the balancing weight is fixed in the box body; the base front cover is provided with a connecting hole configured to be passed through by the plug connector; the pressure plate is installed on an inner side of the base rear cover.

In an example, a groove is formed on an outside surface of the base rear cover, and the pulling member is accommodated in the groove.

In an example, the bracket assembly further comprise a second lamp pole, the second lamp pole and the first lamp pole are movable connected by a rotating assembly, so that the second lamp pole is rotatable relative to the first lamp pole.

In an example, the rotating assembly comprises: a sleeve fixed on the first lamp pole and a rotating shaft installed on the second lamp pole, the rotating shaft is rotatably plugged into the sleeve.

In an example, the sleeve comprises a tube body and a wing, the wing is extended radially outward from the tube body, and a first fixing hole is provided on the wing.

In an example, the first lamp pole is a pipe member, the first lamp pole is provided with a first installation hole, the tube body is extended from inside of the first lamp pole through the first installation hole to outside of the first lamp pole, and the wing is fixed on inside of the first lamp pole.

In an example, a first liner pipe is fixedly arranged in the first lamp pole, the first liner pipe is provided with a liner hole corresponding to the first installation hole, and the tube body is extended from inside of the first liner pipe through the first installation hole and the liner hole to the outside of the first lamp pole; in the first liner pipe, the wing is fixed to the first liner pipe and the first lamp pole.

In an example, the first lamp pole and the first liner pipe are provided with aligned first operating grooves, and the first operating grooves are opened on radially opposite sides of the first installation hole and the liner hole, and the first operating grooves are snapped by a first groove cover.

In an example, the rotating shaft comprises: a rotating portion rotatably plugged into the tube body, and an installation portion installed on the second lamp pole, an outer diameter of the installation portion is larger than an outer diameter of the rotating portion.

In an example, the second lamp pole is a pipe member, a second installation hole is provided on the second lamp pole, and a second liner pipe is fixedly arranged in the second lamp pole corresponding to the second installation hole; and the installation portion is extended from the outside of the second lamp pole through the second installation hole and is fixed to the second liner pipe.

In an example, the second liner pipe is provided with a second fixing hole, an end surface of the installation portion is provided with a third fixing hole corresponding to the second fixing hole, and the rotating shaft and the second liner pipe is fastened by a screw passed through the second fixing hole and the third fixing hole.

In an example, the second lamp pole and the second liner pipe are provided with aligned second operating grooves, and the second operating grooves are opened on the radially opposite sides of the second installation hole and the second fixing hole, and the second operating grooves are snapped by a second groove cover.

In an example, a first threading through hole is axially provided on the rotating shaft, the first threading hole is deviated from the third fixing hole, and the second liner pipe is provided with a second threading hole corresponding to the first threading hole, a cable extends from inside of the first lamp pole to inside of the second lamp pole through the first threading hole and the second threading hole.

In an example, the rotating portion is extended through the tube body, an elastic washer and a tightening nut are installed at an end of the rotating portion, and the elastic washer frictionally fits the tub body by the tightening nut.

In an example, the first lamp pole is provided with a second lamp body, and/or the second lamp pole is provided with a second lamp body, the first lamp pole is a tubular body, and/or the second lamp pole is a tubular body, and the tubular body is provided with a light emitting area for the second lamp body.

In an example, the second lamp body comprises: a light source in the tubular body corresponding to the light emitting area; and a light-transmitting cover embedded in the light emitting area.

In an example, the light-transmitting cover is flush with a surface of the tubular body.

In an example, the light emitting area is arranged along the axial direction of the tubular body, the light source comprises a plate body carrying a plurality of light emitting points which are discrete, and the plurality of light emitting points are arranged along the axial direction of the tubular body corresponding to the light emitting area.

In an example, the light emitting points are light-emitting diodes.

In an example, the second lamp body further comprises a light-transmitting cover bracket, and the light-transmitting cover bracket is arranged in the tubular body and is configured to support the light source and the light-transmitting cover.

In an example, viewed from a cross-section, the light-transmitting cover bracket comprises two extending arms that are spaced apart from each other and a connecting portion connecting the two extending arms; opposite sides of the two extending arms are respectively provided with grooves, the plate body is carried on the grooves, and the two extending arms that are spaced apart from each other is configured to support the light-transmitting cover.

Compared with other implementations, the present disclosure has the following beneficial effects: when a lighting fixture of the present application is used, the first lamp pole can be moved away from the base assembly, so that the lighting fixture can be turned on to use the lighting fixture. When the lighting fixture needs to be stored, the first lamp pole can be moved close to the base assembly, thereby reducing the volume of the lighting fixture for easy storage, which is convenient for use by a user.

The above descriptions are merely examples of the present application, and are not intended to limit the present application. Various modifications and variations of this application are possible for those skilled in the art. Any modification, equivalent replacement, improvement, and the like made within the spirit and principle of the present application shall be included within the scope of the present application.

What is claimed is:

1. A lighting fixture, comprising:
a base assembly; and
a bracket assembly connected with the base assembly, and the bracket assembly is configured to carry a first lamp body,
wherein the bracket assembly comprises a first lamp pole movably connected with the base assembly, so that the first lamp pole is capable of moving close to or moving away from the base assembly, and
wherein the base assembly further comprises a second lamp pole, the second lamp pole and the first lamp pole are movable connected by a rotating assembly, so that the second lamp pole is rotatable relative to the first lamp pole; and
the rotating assembly comprises:
a sleeve fixed on the first lamp pole; and
a rotating shaft installed on the second lamp pole, wherein the rotating shaft is rotatably plugged into the sleeve.

2. The lighting fixture according to claim 1, wherein:
an end of the first lamp pole is provided with a plunger with an inner cavity, and a circumferential side wall of the plunger is provided with a notch extending from an end of the plunger along a generatrix; and
the base assembly comprises a body and a plug connector extending outward from the body, the plug connector comprises a plug provided with a first through hole, the plunger is provided with a hinge hole corresponding to the first through hole, and the plug and the plunger are hinged together through a hinge shaft passed through the first through hole and the hinge hole, and wherein:
in a first state, an axis of the plug and an axis of the plunger are both in a vertical direction, so that the first lamp pole is in a vertical state; and
in a second state, the axis of the plug is in the vertical direction, and the axis of the plunger is deviated from the vertical direction, so that the first lamp pole is rotated relative to the base assembly.

3. The lighting fixture according to claim 2, wherein:
an end face of an end of the plunger is provided with a plug hole connected with the inner cavity of the plunger, and the plug hole is separated from the notch;
the plug connector further comprises a base portion set in the body, and the base portion is provided with a second through hole corresponding to the plug hole; and
the base assembly further comprises an elastic pin and an elastic member installed on a tail of the elastic pin; and wherein:
in the first state, the elastic member is loosened, so that the elastic pin is extended through the second through hole and the plug hole to enter the inner cavity of the plunger, so as to ensure the axis of the plug and the axis of the plunger both in the vertical direction, so that the first lamp pole is remained in the vertical state; and
in the second state, the elastic member is compressed, the elastic pin leaves away from the inner cavity of the plunger, the axis of the plunger is deviated from the vertical direction, and the first lamp pole is rotatable relative to the base assembly.

4. The lighting fixture according to claim 3, wherein an end wall of the plunger is formed as a first inclined surface, a top surface of a head of the elastic pin is formed as a second inclined surface, and the second inclined surface is matched with the first inclined surface.

5. The lighting fixture according to claim 3, wherein:
the base assembly further comprises a pressure plate in the body, the pressure plate is provided with an operation hole, the head of the elastic pin is located in an inner side of the pressure plate, and the tail of the elastic pin is extended through the operation hole; and
the base portion of the plug connector is fixed on the pressure plate, an end of the elastic member is fixed on the tail of the elastic pin, and other end of the elastic member is fixed on the pressure plate.

6. The lighting fixture according to claim 5, wherein:
a pulling member is installed on the tail of the elastic pin, and the pulling member is located in an outside of the pressure plate, and
the pulling member comprises a nut installed on the tail of the elastic pin and a pull ring movably installed on the nut.

7. The lighting fixture according to claim 6, wherein:
the body of the base assembly comprises a base front cover, a base rear cover, and a balancing weight, the base front cover and the base rear cover are fastened into a box body, and the balancing weight is fixed in the box body;
the base front cover is provided with a connecting hole configured to be passed through by the plug connector;
the pressure plate is installed on an inner side of the base rear cover; and
a groove is formed on an outside surface of the base rear cover, and the pulling member is accommodated in the groove.

8. The lighting fixture according to claim 1, wherein the sleeve comprises a tube body and a wing, the wing is extended radially outward from the tube body, and a first fixing hole is provided on the wing.

9. The lighting fixture according to claim 8, wherein the first lamp pole is a pipe member, the first lamp pole is provided with a first installation hole, the tube body is extended from inside of the first lamp pole through the first installation hole to outside of the first lamp pole, and the wing is fixed on inside of the first lamp pole.

10. The lighting fixture according to claim 9, wherein:
a first liner pipe is fixedly arranged in the first lamp pole, the first liner pipe is provided with a liner hole corresponding to the first installation hole, and the tube body is extended from inside of the first liner pipe through the first installation hole and the liner hole to the outside of the first lamp pole;
in the first liner pipe, the wing is fixed to the first liner pipe and the first lamp pole; and the first lamp pole and the first liner pipe are provided with aligned first operating grooves, and the first operating grooves are opened on radially opposite sides of the first installation hole and the liner hole, and the first operating grooves are snapped by a first groove cover.

11. The lighting fixture according to claim 8, wherein the rotating shaft comprises:

a rotating portion rotatably plugged into the tube body, and an installation portion installed on the second lamp pole, and wherein an outer diameter of the installation portion is larger than an outer diameter of the rotating portion.

12. The lighting fixture according to claim 11, wherein:

the second lamp pole is a pipe member, a second installation hole is provided on the second lamp pole, and a second liner pipe is arranged in the second lamp pole corresponding to the second installation hole; and the installation portion is extended from the outside of the second lamp pole through the second installation hole and is fixed to the second liner pipe.

13. The lighting fixture according to claim 12, wherein:

the second liner pipe is provided with a second fixing hole, an end surface of the installation portion is provided with a third fixing hole corresponding to the second fixing hole, and the rotating shaft and the second liner pipe is fastened by a screw passed through the second fixing hole and the third fixing hole; and the second lamp pole and the second liner pipe are provided with aligned second operating grooves, and the second operating grooves are opened on the radially opposite sides of the second installation hole and the second fixing hole, and the second operating grooves are snapped by a second groove cover.

14. The lighting fixture according to claim 13, wherein:

a first threading hole is axially provided on the rotating shaft, the first threading hole is deviated from the third fixing hole, and the second liner pipe is provided with a second threading hole corresponding to the first threading hole, and a cable extends from inside of the first lamp pole to inside of the second lamp pole through the first threading hole and the second threading hole.

15. The lighting fixture according to claim 11, wherein the rotating portion is extended through the tube body, an elastic washer and a tightening nut are installed at an end of the rotating portion, and the elastic washer frictionally fits the tub body by the tightening nut.

16. The lighting fixture according to claim 8, wherein the first lamp pole is provided with a second lamp body, and/or the second lamp pole is provided with a second lamp body, the first lamp pole is a tubular body, and/or the second lamp pole is a tubular body, and the tubular body is provided with a light emitting area for the second lamp body.

17. The lighting fixture according to claim 16, wherein the second lamp body comprises:

a light source in the tubular body corresponding to the light emitting area; and a light-transmitting cover embedded in the light emitting area, wherein the light-transmitting cover is flush with a surface of the tubular body.

18. The lighting fixture according to claim 17, wherein the light emitting area is arranged along the axial direction of the tubular body, the light source comprises a plate body carrying a plurality of light emitting points which are discrete, and the plurality of light emitting points are arranged along the axial direction of the tubular body corresponding to the light emitting area.

19. The lighting fixture according to claim 18, wherein:

the second lamp body further comprises a light-transmitting cover bracket, and the light-transmitting cover bracket is arranged in the tubular body and is configured to support the light source and the light-transmitting cover; and viewed from a cross-section, the light-transmitting cover bracket comprises two extending arms that are spaced apart from each other and a connecting portion connecting the two extending arms; and wherein:

opposite sides of the two extending arms are respectively provided with grooves, the plate body is carried on the grooves, and the two extending arms that are spaced apart from each other is configured to support the light-transmitting cover.

* * * * *